United States Patent [19]

Stern et al.

[11] Patent Number: 4,695,411

[45] Date of Patent: Sep. 22, 1987

[54] PROCESS FOR MANUFACTURING A COMPOSITION OF FATTY ACID ESTERS USEFUL AS GAS OIL SUBSTITUTE MOTOR FUEL WITH HYDRATED ETHYL ALCOHOL AND THE RESULTANT ESTERS COMPOSITION

[75] Inventors: Robert Stern, Paris; Gérard Hillion, Herblay; Paul Gateau, St Nom La Breteche; Jean-Claude Guibet, St Germain En Laye, all of France

[73] Assignee: Institut Francais du Petrol, Rueil-Malmaison, France

[21] Appl. No.: 830,169

[22] Filed: Feb. 18, 1986

[30] Foreign Application Priority Data

Feb. 15, 1985 [FR] France ................................ 85 02340

[51] Int. Cl.$^4$ ............................. C11C 3/04; C11C 3/10
[52] U.S. Cl. ................................. 260/410.9 R; 44/66; 260/421
[58] Field of Search ........................... 260/410.9 E, 421

[56] References Cited

U.S. PATENT DOCUMENTS

| 2,271,619 | 2/1942 | Bradshaw et al. | 260/410.9 E |
| 2,383,601 | 8/1945 | Keim | 260/410.9 E |
| 3,459,736 | 8/1969 | Dalibor | 260/410.5 |
| 4,371,470 | 2/1983 | Matsukura et al. | 260/410.9 E |

*Primary Examiner*—J. E. Evans
*Attorney, Agent, or Firm*—Millen & White

[57] ABSTRACT

The invention concerns a process for manufacturing a composition of fatty acid esters useful as gas oil substitute motor fuel, said composition containing at least one hydrated ethyl alcohol.

The process comprises:

(A) A first acid transesterification step in the presence of at least one aliphatic, linear or branched monoalcohol of 1 to 5 carbon atoms, consisting at least partly of hydrated ethyl alcohol containing 1 to 60% by weight of water, said step leading to the formation of a phase mainly containing ethyl esters after removal of the produced glycerol phase, (B) A second step wherein the initial free acidity or that formed during the first step in the phase containing the esters is decreased to a value at most equal to about 2%; and (C) A third step of basic transesterification of the phase resulting from step B, in the presence of at least one aliphatic, linear or branched monoalcohol of 1 to 5 carbon atoms, with the recovery of the so-formed ester composition.

The composition of the invention can be used for combustion in Diesel engines.

17 Claims, No Drawings

PROCESS FOR MANUFACTURING A COMPOSITION OF FATTY ACID ESTERS USEFUL AS GAS OIL SUBSTITUTE MOTOR FUEL WITH HYDRATED ETHYL ALCOHOL AND THE RESULTANT ESTERS COMPOSITION

The invention concerns a new process for manufacturing a fatty acid ester composition comprising a major portion of ethyl esters useful as gas oil substitute motor fuel, the raw materials consisting of oil or a grease of vegetable or animal origin and of one or more alcohols, mainly hydrated ethyl alcohol. It also concerns the ester compositions obtained by said process.

BACKGROUND OF THE INVENTION

These esters are destined for use as substitute of gas oil and must be of high purity, generally at least 97% esters content. On the other hand, after purification, it is desirable that the yield by weight of raw esters, in proportion to the oil and irrespective of the alcohol content in the ester phase, be at least equal to 95% and preferably from 97 to 102%.

Transesterification or alcoholysis of triglycerides or oils of vegetable or animal origin in the presence of an alcohol or acid or basic catalyst advantageously leads to the formation of fatty acid esters of alcohol and glycerol. Reference can be made in this respect to U.S. Pat. No. 4,164,506 and European Pat. No. 127,104.

The U.S. Pat. No. 2,383,601 recommends the use of absolute alcohol (methanol) in the presence of acid oils.

With absolute ethyl alcohol and acid oils (presence of fatty acids) or conversely with a neutral oil and hydrated alcohol, the transesterification by acid catalysis results in only a partial conversion rate. A certain amount of fatty acid is formed or remains which has to be neutralized in order to prevent any possible corrosion when the ester is used as a motor fuel. The neutralization results in the removal of said acids as salts but significantly reduces the yield to esters inasmuch as the latter are driven along with the sodium or potassium salts in an aqueous glycerol phase or even in the solid formed by the fatty acid salts.

The use of ethanol as a reactant therefor implies, according to several papers, that it is in anhydrous state and that the oils are neutral (J. GRAILLE in "Biomasse actualité" p. 35 June 1984).

In basic catalysis where generally the transesterification reaction is quick, neutral or weakly acid oils are used as starting materials since a too high proportion of fatty acids (>0.5%) would inhibit the reaction by consuming catalyst to form soaps. According to FREEDMAN et al in JAOCS 61 No. 10 p. 1638, the catalyst mixture components, alcohol and oil, must be anhydrous since otherwise the yield to ester decreases, the reaction not being complete.

When using absolute alcohol and a neutral oil the problems are merely displaced. Industrial requirements for the drying of ethyl alcohol include sophisticaed equipment such as a plate column when the drying is achieved by an azeotropic carrying effect. When the alcohol is dried by means of molecular sieves, it is necessary, for example, on the basis of stoichiometrical ratio of 2, to use an amount of sieves of about 150 kg/t with an alcohol containing 7% of water. Moreover the oils must be subjected to an alkaline or physical refining which may be very costly in a small plant. Finally, with absolute alcohol, glycerol as formed does not settle spontaneously and the alcohol excess must be evaporated or water added, nevertheless not obtaining a complete conversion, the latter being generally obtained only with very high alcohol amounts. Finally, it should be very interesting to use hydrated ethyl alcohol in the manufacture of fatty acid esters.

As a matter of fact, the use of such an alcohol makes possible to consider the manufacture of gas oil substitute in a country or on a site where the industrial infrastructure is weak. For this purpose it suffices to manufacture an alcohol from fermentation products and to use a press to manufacture oil. An advantage of the use of hydrated alcohol is its low manufacturing cost.

Now, it has been surprisingly found that it was possible not only to use hydrated alcohol with success but that the use of said alcohol results in a simplification of the process for manufacturing the ester.

The process is simplified since, in the presence of hydrated alcohol, glycerol is easily settled and the ester phase is purer and the glycerol content lower even though the alcohol contains more water.

OBJECTS OF THE INVENTION

One object of the present invention is hence to provide an economical process for manufacturing a mixture of esters of high purity and yield, useful as gas oil substitute motor fuel, from hydrated alcohol.

Another object of the invention is to provide a process which can be applied not only with the use of neutral, weakly acid or degummed oils or greases but also with acid or very acid oils or greases.

The oil acidity is expressed as a percentage by weight of the preponderant fatty acid in the oil.

The process according to the invention makes possible the use of oils or greases having an acidity up to about 50%.

Another object of the present invention is to provide a process which can be directly applied to the manufacture of esters from seeds by using an extraction solvent, and also as a reactant, ethyl alcohol which, in contact with the seeds, may be more or less hydrated. This process can be applied to cotton seeds.

SUMMARY OF THE INVENTION

In order to meet these objects, the invention provides a process for manufacturing a composition of fatty acid esters comprising a major proportion of ethyl esters usable as gas oil substitute motor fuel, by transesterification of an oil and/or grease of vegetable or animal origin optionally containing free acids; this process comprises:

(a) a first step comprising at least one transesterification of said oil or grease in the presence of at least one monoalcohol consisting at least in major part of ethyl alcohol, said ethyl alcohol containing 1 to 60% by weight of water, and of an acid catalyst, said transesterification leading to the formation of a phase of high ester content and a phase of relatively high glycerol content, said first step being conducted in such conditions as to obtain a substantial conversion of oil or grease, (b) a second step wherein, after removal of the glycerol phase, the initial acidity, or the acidity formed during the first step, of the ester-containing phase is decreased to a value of at most about 2%; and (c) a third step wherein the phase resulting from the second step is subjected to at least one transesterification in the presence of at least one alcohol and of a basic catalyst, said transesterification leading to the formation of a phase containing mainly esters which are recovered and an alcohol phase, the alcohol being an aliphatic, linear or branched monoalcohol of 1 to 5 carbon atoms.

The first acid transesterification step is conducted with hydrated ethyl alcohol containing preferably 4 to 50% by weight of water. Excellent results were obtained with ethyl alcohol containing 7 to 30% by weight of water.

The first acid transesterification step of oils and/or greases with hydrated ethyl alcohol is performed in the presence of an acid catalyst, these oils being either raw, degummed (after precipitation of lecithin), acid or neutral oils.

The acid catalysts may be soluble or insoluble. As a soluble acid catalyst, sulfonic acids or any other strong acid including sulfuric acid or hydrochloric acid can be used. Since corrosion is generally increased by the presence of inorganic acids, sulfonic acid is preferably used. However it is also possible to use a mixture of sulfuric and sulfonic acids in order to conserve sulfonic acid. Examples of sulfonic acids are toluene, xylene, benzene, and naphthalene-sulfonic acids; dodecyl and diodecyl-benzene-sulfonic acids, the sulfonic acids obtained by sulfonation of fatty acids; esters oils; phenolsulfonic acids; the Twitchell reactant; sulfonic acids from oil cuts and sulfonic acids of polymers.

The operating conditions are such as to provide for an acid transesterification of triglycerides instead of an esterification of the fatty acids which esterification may increase when the water content of the alcohol is high. The proportion of acid catalysts with respect to the oil or grease amount ranges from 0.1 to 3% by weight and preferably from 0.3 to 1% for soluble catalysts and from 1 to 20% by weight and preferably from 5 to 10% for insoluble solid catalysts.

The alcohol amounts range from 1 to 2.5 times the stoichiometrical amount (3 moles of monoalcohol per mole of triglyceride) but are preferably from 1.1 to 1.6 times the stoichiometrical amount. The alcohol may contain various denaturants, preferably those which are non basic. The reaction temperatures are generally from 70° to 150° C., preferably from 80° to 130° C. The reaction velocity is closely dependent on the temperature. In the range from 70° to 130° C., an acceleration factor or more than 50 may be obtained. The reaction time is for example from 30 minutes at high temperature to 24 hours at low temperature.

Under these conditions, the first acid transesterification step enables at least 75% of conversion to ethyl esters, for example, with respect to the oil and preferably enables conversions of 85 to 90%.

However, even when continuing the reaction over a long time, it does not provide for a complete conversion since the free acid, in equilibrium with the water and the ester, is always present and, on the other hand, an equilibrium is achieved between the triglycerides, diglycerides, monoglycerides and glycerol and the ethyl esters.

The reaction can be conducted in autoclave at 120°–130° C., all the components being supplied together at the beginning, or in a reactor with reflux where hot alcohol is continuously introduced in the heated oil so as to maintain, in this particular operating manner, the temperature between 85° to 125° C. or even merely at reflux by introducing the whole alcohol amount at the beginning; the temperature is then lower and the reaction time longer. After cooling, preferably between 40° and 60° C., the reaction mixture is easily settled and there is recovered a raw ester phase and a glycerol phase which contains the most part of water and generally some catalysts, if the catalyst is hydrophilic.

The oil or greases used as basic materials for manufacturing esters are very diversified and comprise, for example, oils from copra, babassu, cabbage-palm, tucum, murumuru, palm oil, lard, tallow, melted butter, oils from shea butter tree, illipe, olives, pea-nuts, kapok, bitter dates, papaw-tree, colocynth, croton, cyperus, spurge, hemp, beech, ketmia, pulghera, camelina, safflower, ayan, turnsole, hevea, purga coconut, walnut, fever nut, corn, soya, cotton, sorghum, grape stones, linseeds, tobacco, common pine, afzelia, rutabaga, mustard seed, brown mustard, China wood, candleberry-tree, aleurite, amoora, fir, sea-kale, perilla, sesame, colza and tall oil. Preferably saturated oils such as copra oil, palm oil or a solid palm fraction or still degummed oils of high phosphatides content such as soya or colza are used.

The second step provides for the reduction of the acidity of the ester phase after the first step, said acidity being sometimes as high as 14% or more when using an alcohol with 50% water content and for example a palm oil.

In said step the acidity can be reduced to a value of at most 2% and preferably at most 1% since otherwise the loss in yield may range from 15 to 50% of the oil during the third step when the acidity is not reduced.

The reduction of acidity may be advantageously performed in several ways and particularly:

by slowly decreasing the temperature, preferably during the first step before the settling step, by esterification in the presence of a drying agent for alcohol, such agent being used in a small amount since it has only to dry 20 to 30% of the total alcohol amount involved (which has often a composition close to the azeotrope), in the ester, by esterification of a substantially dry alcohol (methanol, propanol or butanol for example) introduced after distillation of the alcohol-water remaining parts still contained in the ester.

by esterification in the presence of an azeotropic mixture comprising a third solvent for removing water, separated in the heteroazeotrope.

The free acids could be removed by neutralization by means of weak or stong base. But such an operation would substantially decrease the yield to esters and would require a treatment of the glycerinous or alkaline phase.

A preferred operating manner is to combine the temperature decrease with the esterification of a dry alcohol in the presence of a drying agent or a third solvent for decreasing the free acidity.

In order to achieve the esterification, it is generally not useful to add an acid catalyst. However, when after the first step the catalyst has been completely removed during the settling (when certain inorganic acids are involved) it is necessary to add a catalyst, which can be either soluble or insoluble (acid ion exchange resins for example).

The simpler and quicker esterifying method is heating the raw ester in the presence of an acid catalyst, evaporating the alcohol present in the ester phase, passing alcohol-water through a column of 3 A molecular sieve after condensation of the vapors and recycling the alcohol, water being retained by the sieve.

When taking into account the water of the alcohol which is generally present in the ester in a proportion close to that of an azeotrope, even when the alcohol used in the first step contains for example 30% of water and the condensation water resulting from the esterification of the free acid, the required total sieve amount is about 25 to 50 kg per metric ton of oil or ester. The sieve is easily regenerable and does not need to be completely dried before use. When considering the manufacture of esters when starting from an absolute alcohol, it should have been necessary to use 5 times this molecular sieve amount without being sure of a quantitative yield with the alcohol amounts involved.

In order to dry the alcohol, other products may be advantageously used such for example as potassium carbonate, some formolized vegetable granulates or even cationic ion exchange resins, optionally in combination with a molecular sieve.

The regeneration of these dehydrating agents is conducted in a known manner.

Another way to esterify is to evaporate the alcohol and the water from the ester and to add a dry alcohol of the methanol type. Said alcohol provides for an acidity decrease after esterification which is generally sufficient for the basic catalysis in the third step, which is then achieved with methanol.

The obtained product is a mixture of methyl esters with a major part of ethyl esters and the necessary methanol addition, although a small amount, makes the operation of the process more complex, as far as the feed supply is concerned. The same operation of acidity decrease may be conducted with butanol which can be added to the raw ester. The interest of butanol addition is that butanol may displace ethyl alcohol of the ethyl ester and drive along the esterification water at higher concentraions than in the azeotrope. It remains that the supply of a different product, partly consumed, is necessary.

Finally, the acidity decrease by cooling, to a value of about 3 to 4% after the first step is insufficient in order to obtain, after basic transesterification, at least 95% and preferably at least 97% of yield by weight with respect to the involved oil.

The third transesterification step may be conducted with a basic catalyst, e.g., sodium or potassium hydroxide, lithium compounds, alkaline alcoholate or anionic exchange resin. This step has a double interest. On the one hand, it completes the transesterification, thus providing for a 97% purity degree of the final ester and preferably 98 to 99.5%, with respect to the compounds originating from the oil and on the other hand, it provides for the removal of any acid trace and mainly of traces of strong acid. In addition, it removes with the alkaline phase a part of the partial glycerides. Surprisingly high conversion rates are obtained even with a hydrated alcohol which is added to dissolve the alkaline catalyst. The same hydrated alcohol in the presence of oil normally does not provide for a good conversion rate.

The alcohol amount present during said last transesterification step ranges from 2 to 5 times the stoichiometrical amount and preferably from 3 to 4 times with respect to the oil or grease not initially converted to ester. Said alcohol is that found in the ester obtained in the second step and to which is generally added the necessary alcohol amount to dissolve the basic catalyst.

The transesterification with basic catalysts may be conducted one or more times, between 20° and 100° C., preferably between 30° and 50° C. The reaction temperature may be different from the settling temperature which is sometimes higher and generally ranges from 50° to 60° C. The used amount of base corresponds at least to that required for neturalizing the acidity of the ester with an additional amount required for the basic transesterification. The total base amount ranges from 0.1 to 1% and preferably from 0.2 to 0.6% by weight with respect to the initial oil or grease. It is also possible to use a heterogeneous basic catalyst which can be recycled, as an ion exchanger, for example. Then alcohol addition is not required to dissolve the base.

At the end of the transesterification reaction, which takes place quickly, in 5 minutes to 1 hour generally, water can be advantageously added several times, in an amount of 1 to 3% by weight, so as to settle glycerol.

The ester so obtained in the upper phase contains traces of alkaline salts, glycerol, alcohol and water.

The transesterification step may be advantageously repeated by adding traces of sodium hydroxide and alcohol or even merely by adding an aqueous solution of sodium hydroxide, settling again and removing the remaining traces of sodium salts of strong acid and the monoglycerides, if any.

The final purification is achieved in a simple process by passage over acid ion exchange resin which removes the cations or by passage over activated clay or even by washing with water to which an inorganic acid can be added in the first washing step.

The ester still contains alcohol and water when using a process of the ion exchange type except when dry methanol is used in the second and third steps according to the invention, no water addition being then required for settling. However, the presence of alcohol up to 20% by weight does not disturb the operation of an engine although the cetane number is decreased.

When using washing steps, the final ester must be dried by evaporation of the residual water under vacuum in the presence of an aromatic hydrocarbon. It is also possible not to dry and to add a few percent of alcohol.

The process described according to the invention is also applicable to fatty acid esters obtained from mixtures comprising ethyl alcohol, water and one alcohol selected from methyl, propyl, linear or branched butyl alcohols.

Denatured ethyl alcohol contains for example 2% of methanol and isopropanol.

EXAMPLES

The following non limitative examples illustrate the invention without however limiting the scope thereof.

EXAMPLE 1

Manufacture of ethyl esters of cotton oil from a neutralized cotton oil and hydrated alcohol.

(a) 500 g of cotton oil, 125.5 g of denatured ethyl alcohol containing 7% of water and 4 g of a sulfonic acid, the stoichiometry of alcohol with respect to the cotton oil being 1.5, are reacted in an autoclave at 130° C. for 2 hours 30 minutes. After cooling and settling at 60° C., a glycerinous phase is withdrawn. The upper ester phase comprises the ester, the alcohol, water traces and free acid corresponding to 2.5% of oleic acid. The ester purity is 90.5% with respect to the oily compounds of the ester phase. The purity is measured by refraction index of the washed and dried ester, as compared with a pure ester and oil. The purity corresponds in said first phase to a conversion of 90.5% of the oil to ester since all the oily compounds remain in the upper phase.

(b) In the second step the free acid contained in the ester is esterified by heating at reflux the alcohol-water of the ester, which alcohol distills at the temperature of the azeotrope. After passage over a small column of 3A molecular sieve (25 g), the alcohol is recycled to the ester phase. After 45 minutes, the acidity determination, with pH meter, of the ester, gives 0.5% of acid expressed as oleic acid. The ester has a purity of 91.9% with respect to the oily compounds.

(c) In a third step, by basic transesterification, the ester is reacted with 2.5 g of sodium hydroxide in 25 cc of ethyl alcohol at 7% water. After 5 minutes at 35° C., 10 cc of water are added and the mixture is settled at 60° C. after ½ hour. The ester phase is washed once with acid water and three times with deionized water and dried. The ester has a purity degree of 97.6%. The measurement is not only performed by means of a refractometer but with control, by vacuum distillation, of the ester and vapor phase chromatography of the residue in the presence of a standard. The yield by weight is 99%.

EXAMPLE 2

Preparation of ethyl esters from raw acid palm-oil and hydrated alcohol.

500 g of raw palm-oil initially contained 5.2% of acid, expressed as palmitic acid, are heated in the presence of 132 g of denatured ethyl alcohol of 7% water content and 5 g of catalyst consisting of a sulfonic acid of high molecular weight, for 2 hours at 130° C. After cooling, the ester is separated from the glycerol phase. The ester fraction is heated as in example 1 at 85° C., the alcohol is dried by passage over a 3A molecular sieve. During the drying step the acidity of the ester decreases from 3.1% to 0.65%. The ester has a purity of 89% as ester after the first step and 92% after the second step.

The third step, as precedingly, consists in a transesterification with a base (sodium hydroxide). After three washings with water and drying, 496 g of raw ester are obtained with a purity to ester of 98.7%, the conversion by weight being 99%. The ester is subjected to conventional analysis tests for Diesel motor fuels. The results are reported in table I hereinafter.

TABLE I

| Characteristics of the palm ester of example 2 | |
|---|---|
| Density g/ml at 20° C. | 0.8677 |
| Flash point | 180° C. |
| Viscosity at 20° C. | 7.98 mm²/s |
| Viscosity at 50° C. | 3.99 mm²/s |
| Cloud point | 13° C. |
| Pour point | 9° C. |
| Filterability limit temperature | 1° C. |
| Conradson carbon on 10% residue | 0.5% |
| Distillation: | |
| Initial point | 308° C. |
| 5% | 319° C. |
| 10% | 324° C. |
| 20% | 326° C. |
| 30% | 327° C. |
| 40% | 328° C. |
| 50% | 330° C. |
| 60% | 330° C. |
| 70% | 330° C. |
| 80% | 334° C. |
| 90% | 334° C. |
| Distillate by volume % | 97 |
| Residue % | 1.2 |
| Losses % | 1.8 |
| Gross heating value | 39892 kJ/kg |

TABLE I-continued

| Characteristics of the palm ester of example 2 | |
|---|---|
| Cetane number | 54 |

EXAMPLE 3

Preparation of ethyl esters from a very acid (30%) palm-oil and hydrated alcohol.

375 g of raw palm-oil are admixed with 125 g of palmitic acid, 132 g of denatured ethyl alcohol at 7% water, 4 g of sulfonic acid of high molecular weight and the mixture is heated in an autoclave at 130° C. for 3 hours. After slow cooling to 60° C. for 2 hours, the free acidity is reduced to 5.7% and the ester phase, after removal of he glycerol phase, still contains 6.5% of an alcohol of 9% water content. The ester purity is 81%. The procedure is the same as in example 1 for the second step where the acidity falls to 0.6%.

The third step here comprises two successive basic transesterifications at 35° C. for 5 minutes with intermediary addition of water for settling, the reactants proportions being the same as in example 1.

After the second basic transesterification and settling, the ester is passed over a few grams of a cationic ion exchange resin (Amberlyst 15) previously washed with alcohol. The ester purity with respect to the oily compounds of the ester phase is 98.3% and the yield by weight 101% of the raw ester (not including the alcohol and the water traces). The ester may be used directly with the involved alcohol and water, as Diesel motor fuel.

EXAMPLE 4

Manufacture of ethyl esters from raw palm-oil and a hydrated alcohol—Comparison with example 2.

The palm-oil is treated as in example 2. However, for the second step, after evaporation of alcohol-water under the vacuum of a water aspirator, absolute ethyl alcohol is introduced with a trace of sulfonic acid in order to decrease the acidity which amounts to 3.2%. After two hours, this acidity remains pratically unchanged since the water of ester formation is not removed. The third step is achieved at a higher temperature (90° C.) so as to avoid gelification of the ester occurring at lower temperature. The yield by weight to ester of 98.7% purity only amounts to 87% by weight with respect to the oil. The intermediary acidity at the end of the first step, when not reduced, is responsible for the formation of soaps which drive along in the glycerol phase a large part of the esters. Moreover, in this case the transesterification with basic catalysts must be performed at high temperature of 90° C. since, even at 70° C., gelification occurs, thus impeding any settling.

EXAMPLE 5

Preparation of ethyl esters from raw palm-oils.

The palm-oil is treated as in example 2. However, at the end of the first step, after settling of glycerol, alcohol and water are evaporated under the vacuum of water-pump at 80° C. Then, during the second step, methanol (17 g) is introduced instead of dry ethyl alcohol as in example 4 and the mixture is heated for 2 hours at 67° C. Here the acidity is decreased to 0.97%. The basic transesterification is achieved by means of 2.1 g of sodium hydroxide and 12 g of methanol at 60° C. After addition of 10 cc of water, settling and washing of the ester phase, the ester obtained after drying has a 99% purity. The ester is a mixture of ethyl esters in a proportion of more than 70% and methyl esters. This example shows that it is easier to reduce the acidity with methanol than with ethanol. The yield by weight wih respect to the oil is 97%. The amount of esters driven along with the glycerol phase is low.

EXAMPLE 6

(Comparison)

Manufacture of ethyl esters from palm-oil and hydrated alcohol—Comparison with example 2.

1000 g of raw palm-oil, 270 g of denatured ethyl alcohol at 7% water and 7.5 g of sulfonic acid of high molecular weight are heated to reflux for 20 hours. After settling, the oil conversion is 90.5%.

The second step is omitted and a basic transesterification is directly performed with dry ethyl alcohol and 6 g of sodium hydroxide at 35° C. for 5 minutes. The ester has a purity of 94% with the respect to the oily compounds and the yield by weight is only 86% for the washed and dried raw ester. Moreover, the product slowly crystallizes at a temperature of 24° C. Hence it is difficultly acceptable as Diesel motor fuel.

EXAMPLE 7

Manufacture of ethyl esters from raw palm-oil with a hydrated alcohol of 30% water content.

500 g of raw palm-oil are transesterified with 140 g of ethyl alcohol containing 30% of water in the presence of 4 g of sulfonic acid of high molecular weight. The stoichiometry for pure alcohol is here only 1.18 with respect to the oil. After 2 h 30 at 130° C., in autoclave, the mixture is cooled down and settled at 60° C. The acidity thus falls quickly to 6% and then to 0.88% after the treatment performed as in example 2. The conversion of oil to ester is 90.6%. A third step gives, after basic transesterification as in example 3, an ester of 97.8% purity degree. The yield by weight of ester is 99% after passage over acid cationic resin.

The ester still contains 5.3% of alcohol which has the composition of a water-alcohol azeotrope. It may be used as such as Diesel fuel.

EXAMPLE 8

Manufacture of ethyl esters from cabbage-palm oil.

500 g cabbage-palm oil at 7% acid content are transesterified with a mixture of sulfonic and sulfuric acids (0.5% of each component) at reflux of ethyl alcohol with 7% of water (stoichiometrical ratio of 1.45 for pure alcohol).

After 24 h of reaction at 84° C., (the ester is at 89% with respect to the oily compounds of the ester phase) the acidity of the ester phase is 3.5%, expressed as lauric acid. 50 cc of ethyl alcohol and 70 cc of hexane are introduced in the ester. With an apparatus of the Dean-Stark type, the alcohol, hexane and water are evaporated, the hexane-alcohol phase is recycled and the water-alcohol phase withdrawn.

This esterification and drying step leads after a few hours to an acidity of 0.7%.

The third step is performed as in example 1. The ester has a final purity of 98.5%. The yield by weight is 101% after purification as in example 1.

EXAMPLE 9

Manufacture of ethyl esters of colza oil with hydrated ethyl alcohol.

500 g of colza oil are treated as in example 1.

490 g of an ester of 97% purity are obtained, which corresponds to a yield of moe than 98% by weight.

EXAMPLE 10

Manufacture of ethyl esters of coprah with hydrated ethyl alcohol—Comparison with example 2.

A coprah oil is transesterified in the same manner as in example 1. After the first step, an ester is obtained which contains 2.8% of free acid. The ester purity is 89% with respect to the oily compound. The ester is neutralized with a 20% solution of potassium hydroxide in water at 50° C., and then settled. By alkaline alcoholysis at 35° C. after 5 minutes and purification of the ester phase over a cationic resin, 89.6 g of raw ester are recovered from the 100 g involved.

With the use of ammonia to neutralize the acid, the yield would have been only 81% by weight with respect to the involved oil.

EXAMPLE 11

Manufacture of ethyl esters from palm-oil with a hydrated alcohol of 50% water content.

A mixture of 500 g of palm-oil, 5 g of sulfonic acid and 50 g of ethyl alcohol containing 50% by weight of alcohol and 50% of water is heated a reflux under stirring. As soon as the temperature reaches 93° C., 114 g of alcohol containing 50% of water are continuously introduced in such a manner as to maintain the temperature substantially constant. After 16 hours of heating, a raw ester is obtained whose purity is 76.7%.

The acidity is 14.3%. For reducing it, butyl alcohol (70 g) is introduced and the water-alcohol mixture is distilled without recycling.

After a few hours the acidity is reduced to 0.8%. The ester concentration is 88.8%. Two basic catalyses as in example 3 provide 99% of raw ester after purification as in example 3. The mixture of butyl and ethyl esters has an ester purity of 97%.

EXAMPLE 12

Manufacture of ethyl esters from palm-oil and hydrated alcohol with an inorganic catalyst.

500 g of raw palm-oil containing 5.2% of free acid, 169 g of rectified ethyl alcohol at 6% water and 20 g of hydrochloric acid at 37% of acid are heated to boiling under reflux. The starting temperature is 86° C. at the drum bottom. The conversion to ethyl ester, after 11 hours, is 79.3%. After settling of 99.6 g of the glycerol phase, the second step starts.

10 g of acid ion exchange resins are added to the ester and a recycled alcohol-water mixture is heated and distilled over 30 g of 3 A sieve. The acidity decreases to 0.9%. At this time, 20 g of 10% sodium hydroxide solution in rectified alcohol are added at 30° C., after filtration of the resin, to the ester and the mixture is quickly heated to 50° C. with addition of 10 cc of water. After decantation of 70 g of a glycerol phase, the transesterification step is repeated but with only one tenth of the sodium hydroxide amount. An ester is obtained whose purity with respect to the oily compounds of the ester is 98.9%. The yield by weight is 97% after purification as in example 3. The Conradson index of the ester on 10% of the residue is 0.3%.

What is claimed as the invention is:

1. A process for manufacturing a composition of fatty acid esters, useful as motor fuel substitute for gas oil, said composition comprising a major proportion of ethyl esters, by transesterification of a starting material oil or grease of vegetable or animal origin, or a mixture thereof, which starting material may contain free acids, said process comprising the following steps:
   (a) in a first acid transesterification step, reacting said starting material oil or grease with ethyl alcohol containing from 1 to 60% by weight of water, in the presence of an acid catalyst, at 70°-150° C. for a time sufficient to transesterify at least 75% of said oil or grease to ethyl ester, and recovering a raw ethyl ester phase containing free fatty acids and a glycerol phase and separating said phases from each other,
   (b) in a second step, reacting said separated raw ethyl ester phase at an acid pH with an alcohol selected from the group consisting of methanol, ethanol, propanol and butanol and simultaneously distilling water from the reaction mixture, so as to form additional ester from said free fatty acids present in said separated raw ethyl ester phase, while decreasing the content of said free fatty acids to at most about 2% by weight of said raw ethyl ester phase,
   (c) in a third step, reacting resultant reaction product of said second step with at least one aliphatic, linear or branched monoalcohol of 1 to 5 carbon atoms in the presence of a basic catalyst, thereby further reducing the content of said free fatty acid in the product of step (b) and forming a purified composition of fatty acid esters.

2. A process according to claim 1, wherein the first transesterification step is performed with hydrated ethyl alcohol containing 4 to 50% by weight of water.

3. A process according to claim 1, wherein said first acid transesterification step is conducted for a time of 30 minutes to 24 hours.

4. A process according to claim 1, wherein the first acid transesterification step is performed in the presence of an amount of alcohol of 1 to 2.5 times the stoichiometrical amount.

5. A process according to claim 1, wherein the first transesterification step is performed in the presence of a soluble acid catalyst used in a proportion of 0.1 to 3% by weight or of an insoluble acid catalyst used in a proportion of 1 to 20% by weight with respect to the oil or to the grease.

6. A process according to claim 1, wherein the oil or the grease has an acidity content of at most about 50%.

7. A process according to claim 1, wherein, in the first step, hydrated alcohol is continuously introduced in a reactor with reflux so as to maintain the reaction temperature between 85° and 125° C.

8. A process according to claim 1, wherein, in the second step, the free acidity, initial or formed during the first step, is decreased to a value of at most 1%.

9. A process according to claim 1, wherein, in the second step, the acidity is decreased by esterification with an alcohol in the presence of an alcohol drying agent.

10. A process according to claim 1, wherein, in the second step, the acidity is decreased by esterification with substantially anhydrous methyl, propyl or butyl alcohol.

11. A process according to claim 1, wherein, in the second step, the acidity is decreased by esterification in the presence of an azeotropic mixture containing a third solvent.

12. A process according to claim 1, wherein the third step is conducted at a temperature of 20° C. to 100° C., in the presence of an amount of alcohol of from 2 to 5 times the total stoichiometrical amount of unconverted oil or grease, in the presence of a basic catalyst used in a proportion from 0.1 to 1% by weight with respect to the oil or to the grease and for a time ranging from 5 minutes to 1 hour.

13. A process according to claim 1, wherein the esters recovered in the third step are subjected to a final purification by successive washings with water followed with a drying step, by successive washings with water followed with alcohol addition, by passage over cationic ion exchange resins or by passage over activated clay.

14. A process according to claim 1, wherein in step (a) the reaction of said oil or grease with ethyl alcohol is conducted for a time sufficient to transesterify at least 95% of said oil or grease.

15. A process according to claim 1, wherein the first transesterification step is performed with hydrated ethyl alcohol containing 7% by weight of water.

16. A process according to claim 1, wherein the time sufficient to transesterify at least 75% of said oil or grease is 0.5–24 hours.

17. A process according to claim 1, wherein in step (b) the alcohol is that alcohol which remains in the raw ethyl ester phase separated in step (a).

* * * * *